United States Patent
Kimura et al.

(10) Patent No.: US 8,994,869 B2
(45) Date of Patent: Mar. 31, 2015

(54) IMAGE PROCESSING APPARATUS AND IMAGE PROCESSING METHOD

(71) Applicant: Panasonic Corporation, Osaka (JP)

(72) Inventors: Masayuki Kimura, Osaka (JP); Hajime Nagahara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/287,757

(22) Filed: May 27, 2014

(65) Prior Publication Data

US 2014/0253784 A1 Sep. 11, 2014

Related U.S. Application Data

(63) Continuation of application No. 13/390,735, filed as application No. PCT/JP2011/003438 on Jun. 16, 2011, now Pat. No. 8,773,570.

(30) Foreign Application Priority Data

Jun. 17, 2010 (JP) .................................. 2010-138782

(51) Int. Cl.
| | |
|---|---|
| *G02B 13/16* | (2006.01) |
| *H04N 5/225* | (2006.01) |
| *H04N 5/232* | (2006.01) |
| *G01C 3/32* | (2006.01) |
| *G02B 27/00* | (2006.01) |

(52) U.S. Cl.
CPC .............. *H04N 5/23212* (2013.01); *G01C 3/32* (2013.01); *G02B 27/0075* (2013.01)
USPC ........... 348/335; 348/340; 348/345; 348/348; 348/350; 348/352

(58) Field of Classification Search
USPC ......... 348/335, 340, 345, 348, 349, 350, 352; 396/121–123
See application file for complete search history.

(56) References Cited

U.S. PATENT DOCUMENTS

| 5,305,092 A | 4/1994 | Mimura et al. |
| 5,664,239 A | 9/1997 | Nakata |

(Continued)

FOREIGN PATENT DOCUMENTS

| CN | 101040295 A | 9/2007 |
| JP | 2963990 | 8/1999 |

(Continued)

OTHER PUBLICATIONS

International Search Report issued Sep. 6, 2011 in corresponding International Application No. PCT/JP2011/003438.

(Continued)

*Primary Examiner* — Yogesh Aggarwal
(74) *Attorney, Agent, or Firm* — Wenderoth, Lind & Ponack, L.L.P.

(57) ABSTRACT

An image processing apparatus includes a focus lens, an image sensor which captures an image and a controller which moves the image sensor or the focus lens. A distance measurer measures a distance to a subject based on a first image and a second image. A focal position moves for the first focal range by moving the image sensor or by moving the position of the focus lens during the first exposure time period, and the focal position moves for the second focal range by moving the image sensor or by moving the position of the focus lens during the second exposure time period.

19 Claims, 14 Drawing Sheets

(56) References Cited

U.S. PATENT DOCUMENTS

| | | | |
|---|---|---|---|
| 7,486,837 | B2 | 2/2009 | Motomura et al. |
| 8,390,932 | B2 | 3/2013 | Jia et al. |
| 2005/0128339 | A1 | 6/2005 | Masuda |
| 2006/0176520 | A1 | 8/2006 | Motomura et al. |
| 2007/0019883 | A1 | 1/2007 | Wong et al. |
| 2007/0189750 | A1 | 8/2007 | Wong et al. |
| 2009/0074393 | A1* | 3/2009 | Park et al. ............ 396/104 |
| 2009/0148147 | A1* | 6/2009 | Fujii et al. ............ 396/128 |
| 2010/0002950 | A1 | 1/2010 | Arieli et al. |
| 2010/0128137 | A1* | 5/2010 | Guidash ............ 348/222.1 |
| 2012/0063008 | A1 | 3/2012 | Jia et al. |

FOREIGN PATENT DOCUMENTS

| | | |
|---|---|---|
| JP | 2001-74422 | 3/2001 |
| JP | 2009-175279 | 8/2009 |
| JP | 2010-16743 | 1/2010 |
| JP | 2010-26801 | 2/2010 |
| WO | 96/30803 | 10/1996 |
| WO | 2010/017694 A1 | 2/2010 |

OTHER PUBLICATIONS

Hajime Nagahara et al., "Flexible Depth of Field Photography", European Conference on Computer Vision (ECCV), Oct. 2008, pp. 1-14.

Paul Green et al., "Multi-Aperture Photography", ACM Transactions on Graphics, vol. 26, No. 3, Article 68, Jul. 2007.

Shinsaku Hiura et al., "Depth Measurement by the Multi-Focus Camera", IEEE Computer Society Conference on Computer Vision and Pattern Recognition, Jun. 23-25, 1998.

Alex P. Pentland, "A New Sense for Depth of Field", IEEE Transactions on Pattern Analysis and Machine Intelligence, vol. PAMI-9, No. 4, Jul. 1987.

Samuel W. Hasinoff et al., "Time-Constrained Photography, Supplementary material", $12^{th}$ IEEE International Conference on Computer Vision (ICCV 2009), Sep. 29, 2009-Oct. 2, 2009.

Muralidhara Subbarao et al., "Depth Recovery from Blurred Edges", Computer Society Conference on Computer Vision and Pattern Recognition (CVPR '88), Jun. 5-9, 1988.

Changyin Zhou et al., "Coded Aperture Pairs for Depth from Defocus", $12^{th}$ IEEE International Conference on Computer Vision, Sep. 29, 2009-Oct. 2, 2009.

Extended European Search Report issued Apr. 23, 2014 in corresponding European Application No. 11795416.4.

Murali Subbarao, "Parallel Depth Recovery by Changing Camera Parameters", Computer Vision., Second International Conference on, IEEE, Dec. 5, 1988, pp. 149-155, Department of Eelctrical Engineering, State University of New York at Stony Brook, Stony Brook, NY, XP032286257, ISBN: 978-0-8186-0883-4.

Office Action issued Jul. 3, 2014 in corresponding Chinese Application No. 201180003331.5 (with partial English translation).

\* cited by examiner

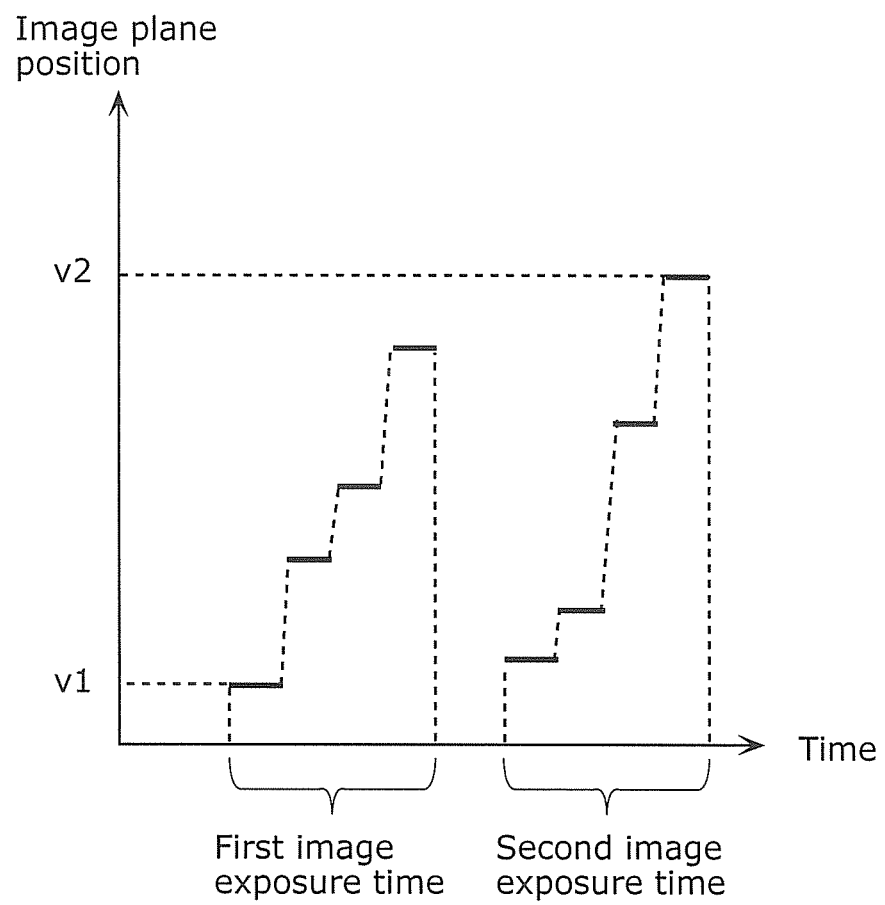

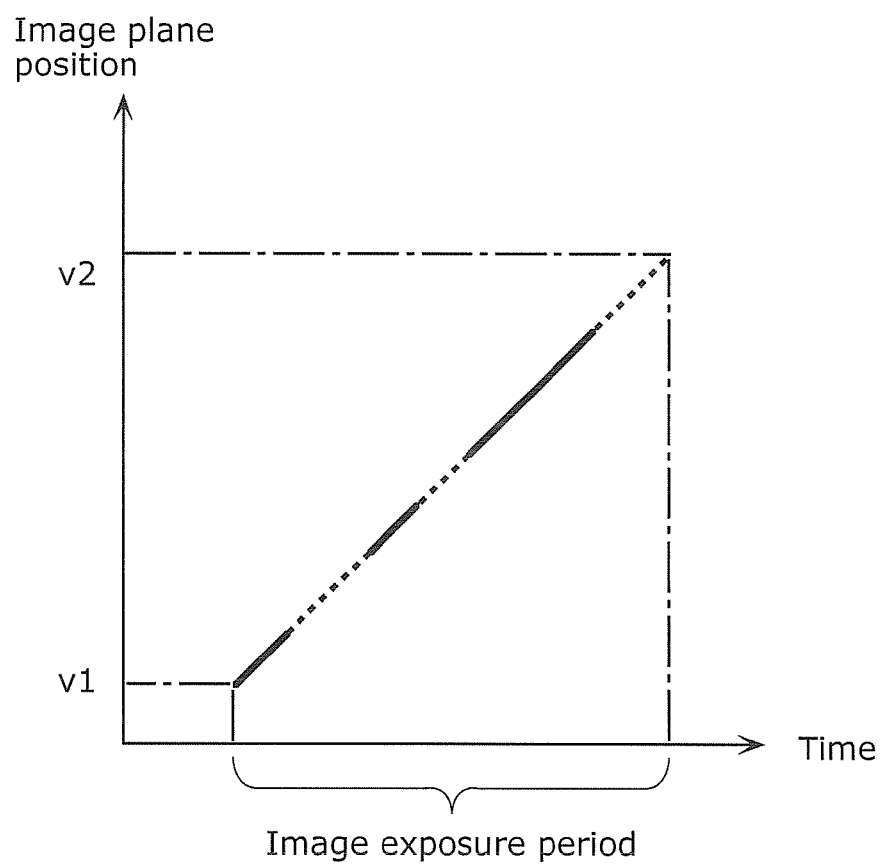

IMAGE PROCESSING APPARATUS AND IMAGE PROCESSING METHOD

BACKGROUND OF INVENTION

1. Technical Field

The present invention particularly relates to an image processing apparatus and an image processing method for measuring a depth of a scene based on a plurality of images captured from a single viewpoint.

2. Background Art

Various techniques have been suggested for measuring, without contact, a depth of a three-dimensional scene, that is, a distance to each subject. Such techniques can be largely classified into a positive technique and a passive technique. The positive technique is to irradiate the subject with infrared rays, ultrasound, or laser, and calculate a distance to the subject based on a length of time until a wave which is reflected returns or an angle of the reflected wave. The passive technique is to calculate the distance based on an image of the subject. Particularly, in the case of using a camera to measure the distance to the subject, the passive technique which does not require an apparatus for emitting infrared rays and so on is widely used.

Various passive techniques have been suggested, one of which is referred to as Depth from Defocus (DFD) which is a technique to measure the distance based on a blur generated by focus change. DFD has features such as not requiring a plurality of cameras, allowing distance measurement using a small number of images, and so on.

DFD is a distance measuring technique using image blur, but there is a problem that it is extremely difficult to judge, from the captured image alone, whether the blur in the captured image was caused by change in lens focus or whether an original image which represents a state without lens-derived blur has a blurred texture from the beginning.

To deal with this, Patent Literature 1 discloses a distance measuring method independent of a spectral component of the original image, which is to compare a ratio between each of a plurality of captured images in a spatial frequency spectrum and a ratio of the blur corresponding to the depth of the scene in spatial frequency spectrum.

On the other hand, Patent Literature 2 discloses a technique to obtain a reference image corresponding to the original image by capturing a large number of images by changing focus and extracting only focused portions of the images. The distance is measured by configuring a scale space in which various blurs are convolved into this reference image and comparing the reference image and captured image on the scale space. In short, the distance measurement is performed by comparing the degrees of blur of the reference image and the captured image.

CITATION LIST

Patent Literature

[PTL 1]
Japanese Patent Gazette No. 2963990
[PTL 2]
US Patent Application Publication No. 2007/0019883, Specification

Non Patent Literature

[NPL 1]
H. Nagahara, S. Kuthirummal, C. Zhou, S. K. Nayer, "Flexible Depth of Field Photography", European Conference on Computer Vision (ECCV), October 2008

SUMMARY OF INVENTION

However, to facilitate measurement, the technique in Patent Literature 1 is configured with a mask having a special structure inserted into an aperture in an optical system such that a zero point appears periodically in the spatial frequency spectrum of the blur. However, this has a problem of causing a decrease in amount of incident light, and it is therefore necessary to either increase sensitivity of the imaging device or increase exposure time. However, the former causes an increase in noise of the captured image, and the latter causes a blur in the subject, and these disturb spectral components of the subject to decrease accuracy in distance measurement.

On the other hand, in the technique disclosed in Patent Literature 2, a depth of field is by far narrower than a distance measurement range unless the aperture is significantly stopped down, thus requiring a large number of images to be captured so as to obtain the reference picture. This offsets an advantage of DFD which allows distance measurement using a small number of images. In addition, such significant stopping down of the aperture allows obtaining the reference image from a small number of images, but also decreases the amount of incident light, so that the technique in Patent Literature 2 has the same problem as the problem of the technique disclosed in Patent Literature 1.

An object of the present invention which is conceived in view of the problem above is to provide an image processing apparatus and an image processing method which allow stable distance measurement from a smaller number of captured images.

An image processing apparatus according to an aspect of the present invention is an image processing apparatus including: an imaging unit which captures an image; a focal range control unit which changes a focal position and a depth of field of the captured image by controlling an imaging device or a focus lens in the imaging unit; and a distance measurement unit which measures a distance to a subject, from a degree of blur in each of n images (where n 2) captured by the imaging unit controlled by the focal range control unit and having focal ranges different from each other.

With such a configuration, it is not necessary to insert a mask into the optical path or stop down the aperture, which does not cause a decrease in light quantity, thus allowing stable distance measurement using a small number of captured images.

In addition, the focal range control unit may extend the depth of field by changing the focal position at an approximately constant speed during exposure of the imaging unit.

With such a configuration, the depth of field is extended by an amount of focus movement, thus allowing distance measurement over a wide range using a small number of captured images.

In addition, the imaging unit may include a wavefront modulation element which is located in an optical path from the subject to the imaging unit and modulates a wavefront of a light beam, or a multifocal lens which is located in an optical path from the subject to the imaging unit and has a plurality of focuses such that the focal range of the image captured by the imaging unit is approximately continuous.

With such a configuration, it is possible to produce the same advantageous effect without moving the focus.

In addition, the focal range control unit may perform control by changing the focal position in phases during exposure of the imaging unit so as to obtain a discontinuous focal range.

With such a configuration, the image having a discontinuous focal range has a special pattern in blur variation, thus allowing such an image to have a blur whose shape can be measured by DFD algorithm more easily.

In addition, the imaging unit may include a multifocal lens which is located in an optical path from the subject to the imaging unit and has a plurality of focuses such that the focal range of the image captured by the imaging unit is discontinuous.

With such a configuration, it is possible to cause the captured image to have a blur whose shape can be measured by DFD algorithm more easily without moving the focus.

In addition, the imaging unit may include: n imaging devices arranged to be different from each other in optical path length from the subject; and a beam splitter which splits a light beam into n beams and guides each of the n beams resulting from the split toward a corresponding one of the n imaging devices, and the focal range control unit may extend the depth of field by changing the focal position at an approximately constant speed during exposure of the imaging unit.

With such a configuration, it is possible to simultaneously capture the n images having focal ranges different from each other, thus reducing time required for the whole processing. In addition, the depth of field of each image is continuously extended, thus allowing distance measurement over a wide range using a small number of captured images.

In addition, the imaging unit may include: n imaging devices; an optical axis change unit which changes an optical axis direction of a light beam; and a drive unit which drives the optical axis change unit to direct the optical axis direction toward one of the imaging devices, and the focal range control unit may change the focal position at an approximately constant speed during exposure of the imaging unit, and the drive unit may cause the optical axis change unit to change the optical axis direction according to a predetermined temporal change pattern.

With such a configuration, it is possible to simultaneously capture the n images having focal ranges different from each other, thus reducing the time required for the whole processing. In addition, since each image has a discontinuous focal range, it is possible to cause the image to include a blur having a shape that allows easier measurement detection by DFD algorithm.

In addition, the image processing apparatus described above may further include a reference image generation unit which generates a reference image from an average image of the n images captured by the imaging unit.

Note that the present invention can be realized not only as an image processing apparatus including such a characteristic processing unit but also as an image processing method including, as a step, processing performed by such a characteristic processing unit included in the image processing apparatus. In addition, the present invention can be realized as a program for causing a computer to execute characteristic steps included in the image processing method. Moreover, it goes without saying that such a program can be distributed via a computer-readable nonvolatile recording medium such as a compact disc read only memory (CD-ROM) or a communication network such as the Internet.

According to the present invention, an image having a focal range wider than normal can be obtained by a focal range control unit without stopping down the aperture, thus allowing obtaining a reference image from a small number of images. In addition, since the focal ranges of the respective images are approximately independent of each other, an image generated by averaging the images has an almost uniform blur with respect to the distance to the subject. Thus, a high-accuracy reference image can be obtained using an easy technique.

BRIEF DESCRIPTION OF DRAWINGS

FIG. 8 is a graph showing a state in which the focal position is changed in phases.

FIG. 14 is a graph showing a state in which the focal position is changed at a constant speed in the variation 2.

DETAILED DESCRIPTION OF INVENTION

Embodiment 1

Hereinafter, an embodiment of the present invention is described using an example.

Figure 1:
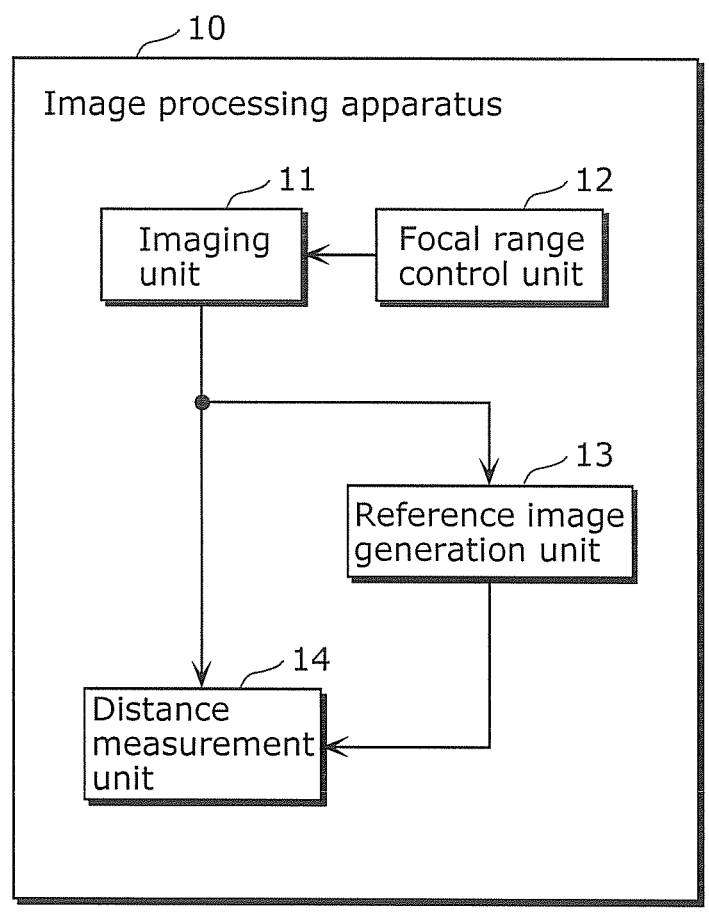
FIG. 1 is a diagram showing a configuration of an image processing apparatus according to an embodiment of the present invention.

FIG. 1 is a diagram showing a configuration of an image processing apparatus according to the embodiment of the present invention. An image processing apparatus 10 includes: an imaging unit 11, a focal range control unit 12, a reference image generation unit 13, and a distance measurement unit 14.

The imaging unit 11 includes: a lens unit that is an optical system in which a light-collecting lens is incorporated; and an imaging device such as a charge coupled device (CCD) sensor or a complementary metal oxide semiconductor (CMOS) sensor. The imaging unit 11 has a function to output an image by capturing an image of a subject.

The focal range control unit 12 has a function to control the lens unit of the imaging unit 11 so that the lens unit changes a focal position and a depth of field of the image captured by the imaging unit 11. Specifically, the focal range control unit 12 performs control by causing an autofocus mechanism incorporated in the lens unit to operate at a specific pattern or switching a particular optical element. The reference image generation unit 13 generates, using the operation performed by the focal range control unit 12, a reference image which estimates a state without blur by lens, from a plurality of images having different focal positions and depths of field.

The distance measurement unit 14 measures a distance to the subject, from blur degrees of the images. More specifically, the distance measurement unit 14 performs distance measurement based on the DFD technique, using the captured images having focal positions and depths of fields different from each other, and the reference image.

Next, the technique of extending the depth of field of the captured image is described.

Generally, a width of depth of field is defined as follows. First, hyperfocal distance will be described. The hyperfocal distance is a distance at which, when focusing the lens at the distance, an area beyond the distance (on a farther side from the lens) up to an infinite distance is judged to be in focus. The hyperfocal distance can be approximated using Expression 1 below when f is a focal distance of the lens, F is an F-number of the lens, and c is a size of a permissible circle of confusion which indicates a smallest detectable blur.

[Math. 1]

$$h = \frac{f^2}{Fc} \quad \text{(Expression 1)}$$

Expression 2 below represents the depth of field at the time of focusing at the distance s, when Dn is the depth of field in a front side (a side closer to the lens), and Df is the depth of field in a rear side.

[Math. 2]

$$\begin{cases} D_n = \frac{(s-f)^2}{h+s-2f} \\ D_f = \frac{(s-f)^2}{h-s} \end{cases} \quad \text{(Expression 2)}$$

According to the expression above, in the case of fixed focal distance, it is possible to change the width of the depth of field only by stopping down the aperture.

In contrast, various techniques have been suggested to extend the width of the depth of field without stopping down the aperture, and such techniques are referred to as extended depth of field (EDoF). Specific EDoF techniques will be described below.

A simplest EDoF technique is to capture a plurality of images by shifting the focal position little by little, and extracting and synthesizing focused portions from these images, and the technique is also used in Patent Literature 2.

Whereas, Non-Patent Literature 1 discloses a technique of changing focus during exposure to realize the same effect as the effect produced by synthesizing a large number of images.

Figure 2:
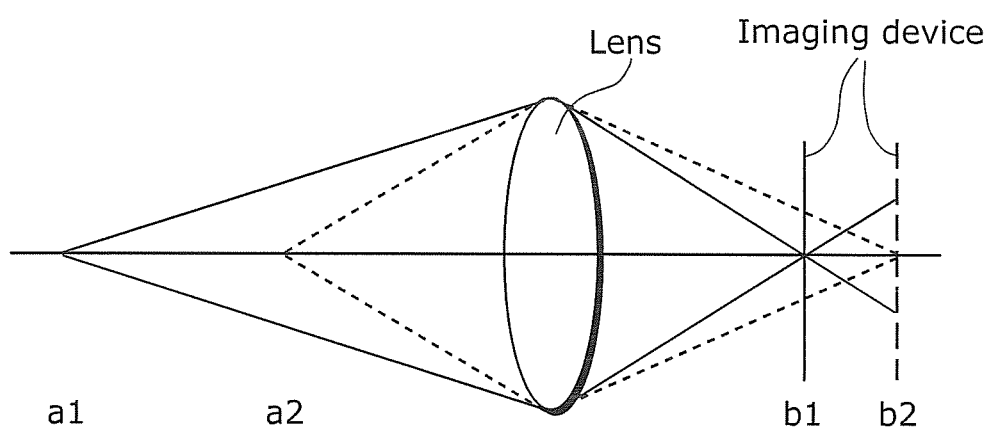
FIG. 2 is a diagram schematically showing a state of light collection at the time of changing focus.

FIG. 2 is a diagram schematically showing a state of light collection at the time of change focus. As shown in FIG. 2, it is assumed that b1 is a position of an imaging device focused at a subject position a1, and b2 is a position of an imaging device focused at a subject position a2. According to the lens formula, the position of the imaging device focused at a distance between a1 and a2 is always between b1 and b2. Accordingly, when the imaging device moves from b1 to b2 during exposure, with respect to a1, the blur gradually becomes larger, starting from a point at which the imaging device is focused at a1, and such blurs are integrated to appear overlapped in the image. On the other hand, with respect to a2, the imaging device is gradually brought into focus starting from a point at which the blur is large, and such blurs still appear overlapped in the image.

This is described in further detail, using an equation. It is assumed that Expression 3 below expresses a shape of a point spread function (hereinafter described as PSF) which represents a state of blur in the optical system.

[Math. 3]

$$PSF(r, u, \Delta v) = \frac{2}{\pi (gb)^2} \exp\left(-\frac{2r^2}{(gb)^2}\right) \quad \text{(Expression 3)}$$

$$\text{Here, } b = \frac{a}{v}|\Delta v|$$

However, f represents a focal distance of the optical system, a represents a diameter of an aperture of the optical system, u represents a distance to the subject (hereinafter, referred to as a "subject distance"), v represents an image plane position defined by a lens formula $1/f = 1/u + 1/v$, $\Delta v$ is an amount of movement of the image plane from v, r represents a distance from a blur center, and g represents a constant.

Since Expression 3 is a function of the amount of movement $\Delta v$, in the case of $\Delta v$ changing from time 0 to time T in accordance with the function V(t) at time t, an ultimate PSF can be defined as Expression 4 below.

[Math. 4]

$$IPSF(r, u) = \int_0^T PSF(r, u, V(t)) dt \quad \text{(Expression 4)}$$

Here, assuming that V(t) is uniform motion, that is, represented by V(t)=v0+st (s is a predetermined constant), Expression 4 can be solved as Expression 5 below.

[Math. 5]

$$IPSF(r, u) = \frac{uf}{(u-f)\sqrt{2\pi}\, rasT} \quad \text{(Expression 5)}$$

$$\left(erfc\left(\frac{r}{\sqrt{2}\, gV(0)}\right) + erfc\left(\frac{r}{\sqrt{2}\, gV(T)}\right)\right) \approx \frac{f}{\sqrt{2\pi}\, rasT}$$

$$\left(erfc\left(\frac{r}{\sqrt{2}\, gV(0)}\right) + erfc\left(\frac{r}{\sqrt{2}\, gV(T)}\right)\right) \text{ (if } u \gg f\text{)}$$

Here, erfc(x) is a complementary error function. When u>>f, that is, when assuming that the subject distance is sufficiently greater than the focal distance of the optical system, it is possible to consider that Expression 5 has a constant value regardless of u. In other words, this means that an image having a constant blur can be obtained regardless of the subject distance. By changing a starting point v+V(0) and an ending point v+V(T) of the image plane position, it is possible to change a range of the subject distance in which the blur is constant.

Figure 3:
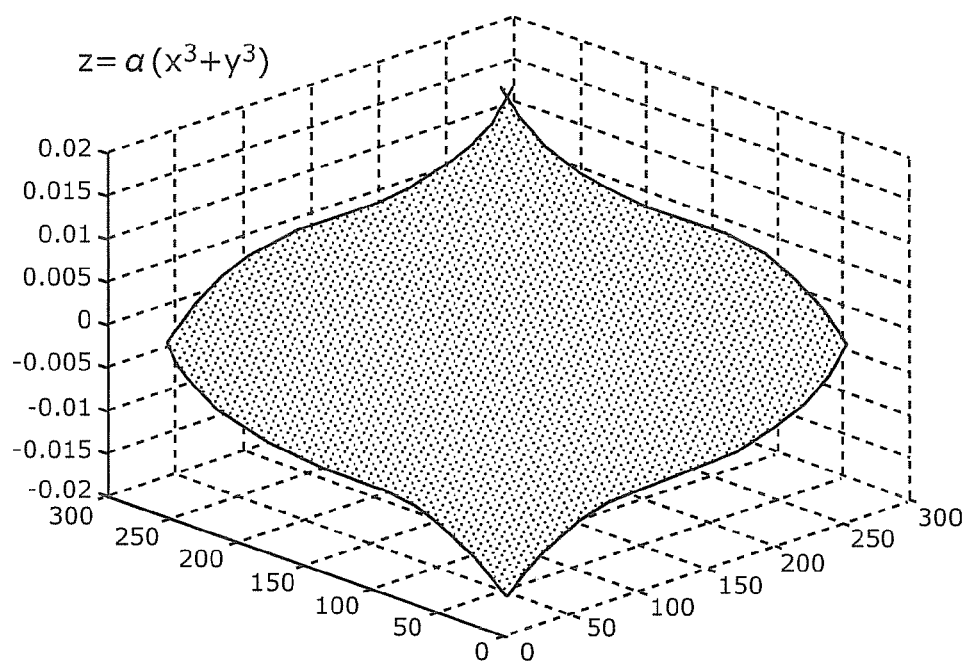
FIG. 3 is a diagram showing a shape of a cubic phase mask.
Figure 4:
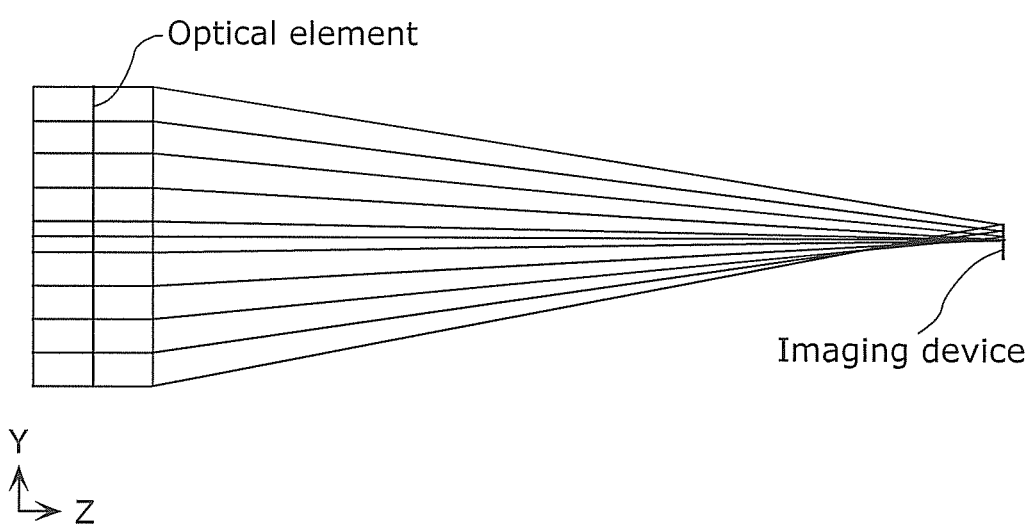
FIG. 4 is a diagram showing a state in which light is collected using the cubic phase mask.

On the other hand, another method has been suggested to extend the depth of field using a special optical element. For example, an optical element referred to as a cubic phase mask, which is a type of a wavefront modulation element that modulates a wavefront of the light, has a shape as shown in FIG. 3. More specifically, the shape can be represented by $z=\alpha(x^3+y^3)$. Here, a is a factor for identifying the shape of the cubic phase mask. When the imaging unit 11 includes an optical element having such a shape on an optical path from the subject to the imaging unit 11, that is, near a diaphragm of the optical system, an arrival point of the light is dispersed due to curvature that varies greatly depending on a pass point for the light as shown in FIG. 4. The cubic phase mask has characteristics that disperse the light almost constantly with respect to the subject distance, so that an image having an almost constant blur can be obtained regardless of the subject distance. A range of the subject distance that gives a constant blur varies according to a shape of the phase mask (wavefront modulation element).

Another example of the optical element is a multifocal lens configured such that an almost continuous focal range can be obtained, using a gradient index lens having a non-uniform refractive index and so on. The multifocal lens is also included in the imaging unit 11 and is provided in the optical path from the subject to the imaging unit 11.

Next, the DFD method using a reference image will be described.

Expression 6 below shows a relationship between a reference image R and a captured image I.

[Math. 6]

$$I(x,y)=R(x,y)*h(x,y,d(x,y))$$  (Expression 6)

Here, h represents PSF at a point (x, y) on the image, and a subject distance d represents the subject distance at the point (x, y). In addition, * in the expression represents a convolution operation. For example, as shown in FIG. 3, since PSF differs according to the subject distance, in the case of a plurality of subjects being present at different distances, it is possible to obtain, as the captured image, an image in which a PSF that is different according to the position of each image is convolved.

Here, it is assumed that the PSF that corresponds to the subject distance d1, d2, . . . , dn is h(x, y, d1), h(h, y, d2), . . . , h(x, y, dn). For example, when the subject in the reference image R(x, y) is located at distance d1, the captured image I(x, y) is equal to an image generated by convolving h(x, y, d1) into R(x, y), and a difference from an observed image is generated in the case of convolving a PSF corresponding to another subject distance into R(x, y). Therefore, the subject distance d(x, y) can be calculated by sequentially comparing the difference between the image generated by convolving each PSF into R(x, y) and the captured image, and finding the distance corresponding to a PSF having the smallest difference. Specifically, the subject distance d(x, y) can be calculated according to Expression 7 below.

[Math. 7]

$$d(x, y) = \operatorname*{argmin}_{d}(I(x, y) - R(x, y) * h(x, y, d))^2$$  (Expression 7)
$$(d = d_1, d_2, \ldots, d_n)$$

Here, the right side represents a value of d at which the value in parentheses is smallest.

In practice, to reduce the influence of the noise included in the captured image I, it is possible to perform distance measurement more reliably by segmenting the image into blocks to calculate a total sum of differences within the block, and performing processing to determine, as the distance for the entire block, the distance at which the difference is smallest.

Figure 5:
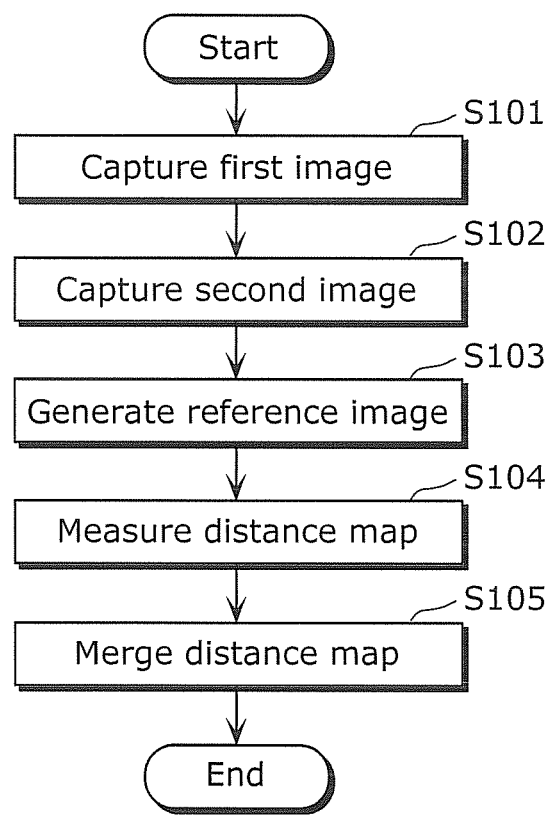
FIG. 5 is a flowchart showing a flow of operation by the image processing apparatus in FIG. 1.

Next, with reference to FIG. 5, described is a flow of processing in which the distance is measured from two images having extended depths of field, using the image processing apparatus according to the embodiment of the present invention. Note that the description below is given assuming that a method of changing focus during exposure is used as a technique to extend the depth of field.

Figure 6:
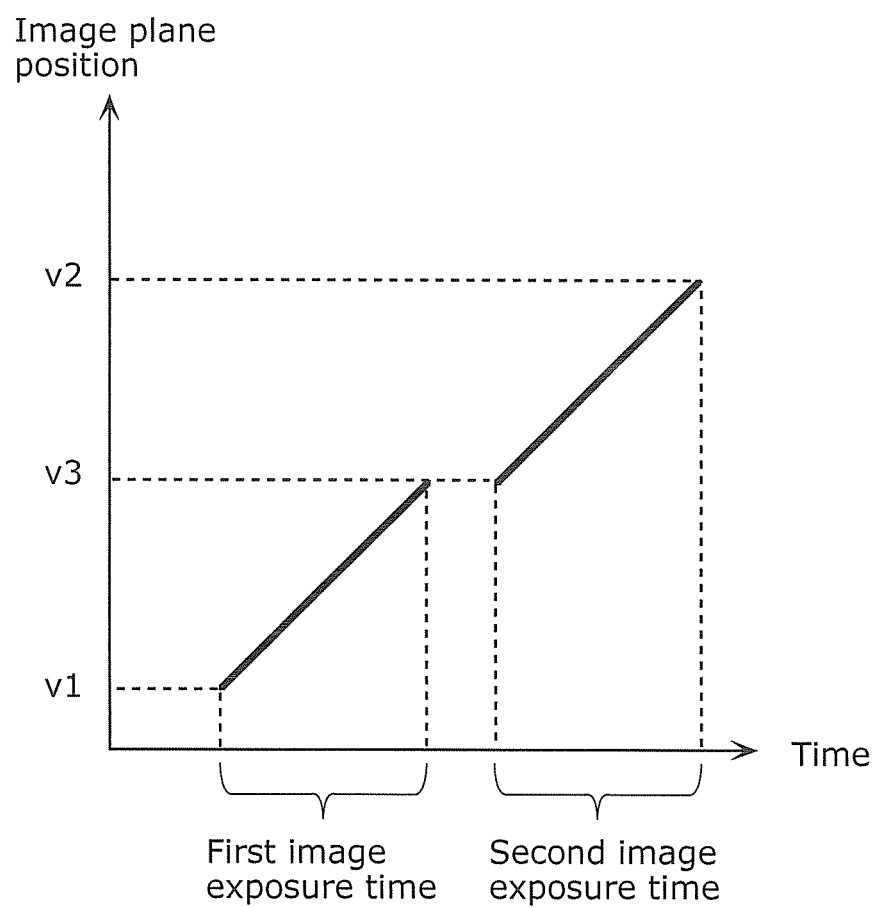
FIG. 6 is a graph showing a state in which a focal position is changed at a constant speed.

First, the imaging unit 11 captures the first image and the second image which have focal ranges different from each other (Steps S101 and S102). Specifically, during the exposure of the first and the second images, the focal range control unit 12 moves the focal position at a constant speed as shown in FIG. 6. The focal position may be moved by moving the imaging device or by moving the position of the lens (focus lens) included in the lens unit. The first image thus captured has a uniform blur within a range that corresponds to image plane positions v1 to v3, and the second image has a uniform blur with a range that corresponds to image plane positions v3 to v2, and the images have blurs according to the distance in the other ranges. A blur that is uniform with respect to the subject distance contributes to the generation of the reference image, and a blur according to the subject distance contributes to the distance measurement by DFD, respectively.

Note that v3 can be set at an arbitrary position between v1 and v2, but it is preferable to set v3 at a midpoint between v1 and v2 so that the exposure time for the first and second images is constant.

In addition, a focus movement speed during the exposure of the first image and a focus movement speed during the exposure of the second image may have different values.

Next, the reference image generation unit 13 generates the reference image from the first and the second images (step S103). From Expression 6, the reference image can be calculated by deconvolving PSF in the captured image. Although originally the subject distance d(x, y) should be known in order to calculate the reference image accurately, PSF is constant with respect to the subject distance within the extended range because the depths of field of the first and the second images are extended.

Here, an average of the first and second images is calculated to generate an average image. As is clear from FIG. 6, the average image is an image having a depth of field extended across the entire range from v1 to v2. Thus, the reference image can be obtained using a type of PSF corresponding to the extended depth of field for the deconvolution.

Note that when the first image and the second image are different in length of exposure time or focus movement speed, it is possible to treat the images equally by calculating a weighted average such that a constant weight is given to the subject distance.

Note that a known technique such as Wiener Filter can be used for deconvolution algorithm.

Lastly, the distance measurement unit 14 calculates the subject distance d(x, y) in accordance with Expression 7, from the captured first and second images and the reference image generated in step S103 (step S104). According to Expression 7, since two different subject distances d(x, y) are calculated using the first image and the second image, these two distances are merged into one distance map (step S105).

For the merger, it is possible to use a technique such as calculating a simple average of the distance maps calculated from the respective images.

Note that the distance measurement may be performed by Fourier transforming Expressions 6 and 7, and comparing the captured image and the reference image in the frequency domain. In the frequency domain, the convolution in Expressions 6 and 7 are transformed into multiplication, to allow performing distance measurement at a higher speed.

As described above, the depth of field, thus extended, allows the reference image to be generated from only two captured images used for distance measurement, to thereby allow accurate distance measurement with using a small number of images. Since the focus change during exposure can be realized by diverting a standard autofocus mechanism, no special mechanism is required.

Note that an example of using two images has been described above, but three or more images may be captured. In this case, by setting the focal range of each image to a range obtained by segmenting a portion between v1 and v2 as shown in FIG. 6 at equal intervals, it is possible to treat the pictures in the same manner as in the case of using two pictures. In this context, the reference image is calculated from an average image of all the captured images.

Note that a method using the reference image has been described in the present embodiment, but it is not essential to use the reference image for the distance measurement; the distance can also be measured from a degree of blur in n images (2≥n) having different focal ranges.

Figure 7:
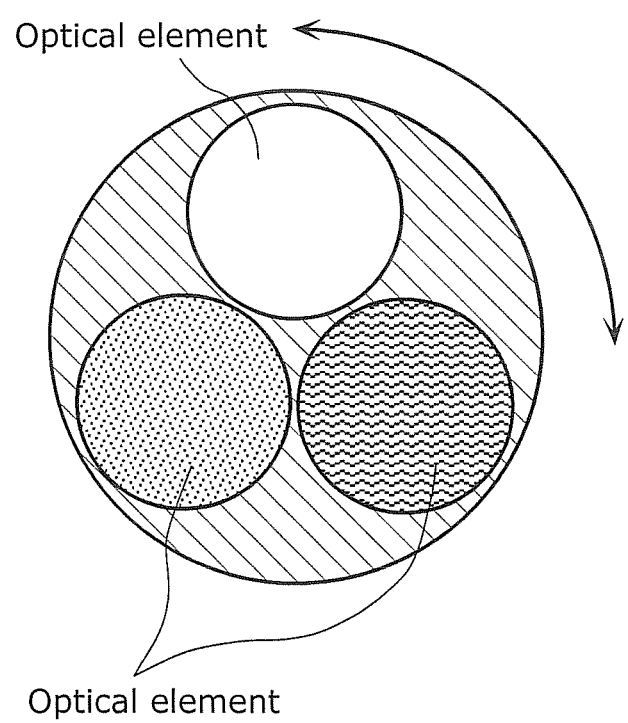
FIG. 7 is a diagram schematically showing a mechanism that switches optical elements having different characteristics.

In addition, an example of extending the depth of field by controlling the focal position during exposure has been described above, but the depth of field may be extended using the optical element such as the cubic phase mask as described earlier. In this case, to obtain different focal ranges, it is necessary to use optical elements having different shapes. Thus, the lens unit included in the imaging unit 11 is provided with a point at which these optical elements can be switched by rotation as shown in FIG. 7. The focal range control unit 12 switches these optical elements, to obtain an image corresponding to each focal range.

Note that the focal range of the captured image has been described above as being continuously extended, but the focal range may be discontinuous as shown in FIG. 8. FIG. 8, as with FIG. 6, is a diagram showing a state in which the focal position is changed during exposure, where the image plane position changes in phases between v1 and v2.

Here, an advantage of having a discontinuous focal range is described. It is assumed that a value of an appropriate distance at position (x, y) is D, and a value of an inappropriate distance is D'. According to FIG. 7, the greater the difference between the results of convolving each of h(x, y, D) and h(x, y, D') into the reference image R, the easier it becomes to determine whether the distance is appropriate or not. This will be verified by simulation below.

Figure 9A:
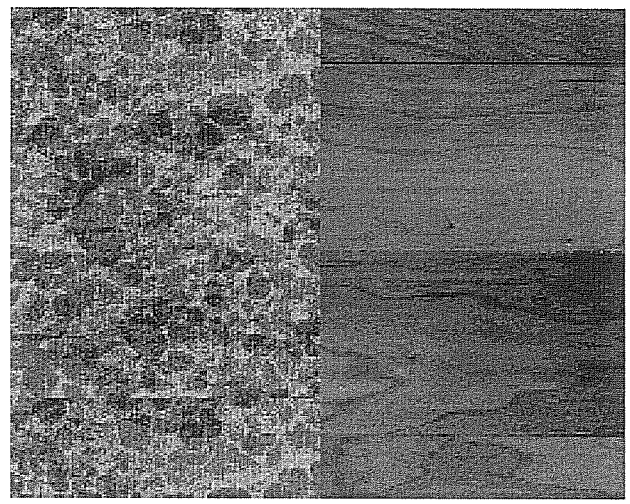
FIG. 9A is a diagram showing a texture of a scene.
Figure 9B:
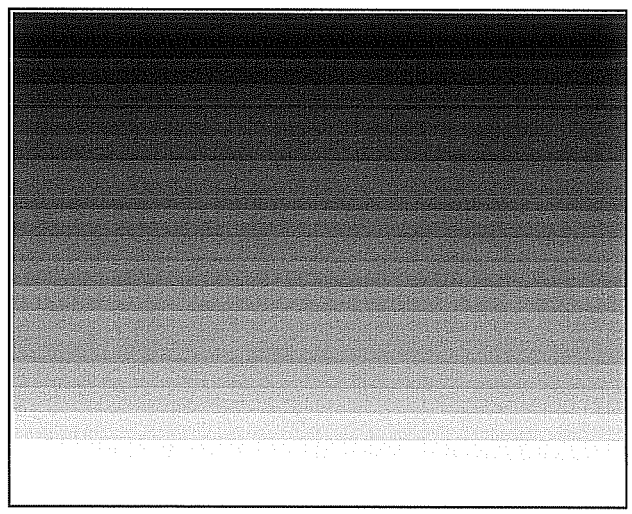
FIG. 9B is a diagram showing a distance to a subject in the scene.

A scene is assumed which has a texture as shown in FIG. 9A and in which the subject distance has a stepped pattern made up of 20 steps in terms of the distance up to the subject as shown in FIG. 9B. It is assumed that a darker portion in the figure indicates a farther subject distance. More specifically, in the texture shown in FIG. 9A, a lower region is closer to the imaging unit 11, and an upper region is more distant from the imaging unit 11.

Next, a notation of the focal range is described. It is understood that whether or not each of the 20 steps in the subject distance is in focus is represented by a 20-digit number. For example, [1, 0, 1, 1, 1, 0, 0, 0, 0, 1, 0, 0, 0, 0, 0, 0, 0, 0, 0, 0,] represents that steps 1, 3, 4, 5, and 10 are in focus, starting from the farthest one.

Figure 10A:
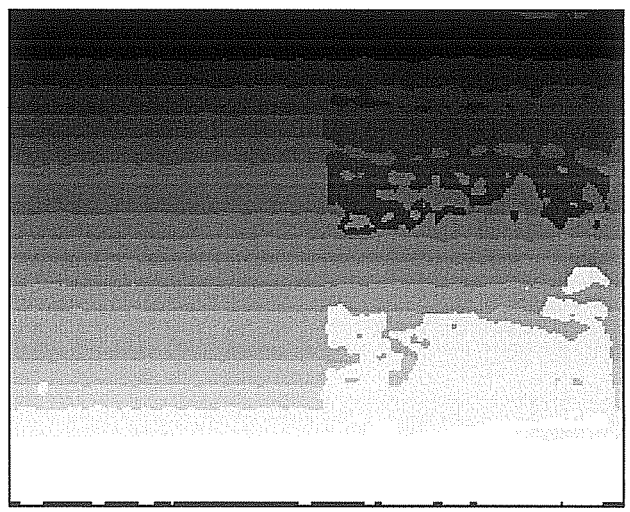
FIG. 10A is a diagram showing a result of distance measurement performed using two images each having a continuous focal range.

First, FIG. 10A shows a result of distance measurement by DFD from two images having focal ranges of [1, 1, 1, 0, 0, 0, 0, 0, 0, 0, 0, 0, 0, 0, 0, 0, 0, 0, 0, 0] and [0, 0, 0, 0, 0, 0, 0, 0, 0, 0, 0, 0, 0, 0, 0, 0, 0, 1, 1, 1] in which, respectively, only front and back sides of the subject are in focus. Note that adding these two images together does not bring the entire subject into focus, so that the subject distance d(x, y) may be calculated according to Expression 8 below.

[Math. 8]

$$d(x, y) = \underset{d}{\mathrm{argmin}}\left(\left|f^{-1}\left(\hat{F}H_1(d) - F_1\right)\right| + \left|f^{-1}\left(\hat{F}H_2(d) - F_2\right)\right|\right)$$ (Expression 8)

$$(d = d_1, d_2, \ldots, d_n)$$

$$\hat{F} = \frac{F_1 H_1^*(d) + F_2 H_2^*(d)}{H_1(d) H_1^*(d) + H_2(d) H_2^*(d) + \varepsilon}$$

However, $F_1$ and $F_2$ represent the frequency components of the first and second images, respectively; $H_1$ and $H_2$ represent frequency components of PSF corresponding to the focal ranges of the first and the second images, respectively; $H_1^*$ and $H_2^*$ are complex conjugates of $H_1$ and $H_2$, respectively; E represents a minor value to prevent division by zero; and $f^{-1}$ represents inverse Fourier transform. In this case, $$\hat{F}$$ [Math. 9]

may be considered to correspond to the reference image R.

Figure 10B:
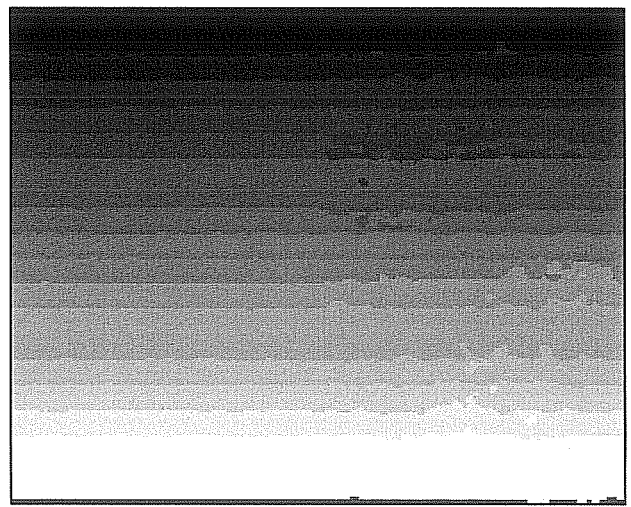
FIG. 10B is a diagram showing a result of distance measurement performed using two images each having a discontinuous focal range.

In contrast, FIG. 10B shows a result of distance measurement performed in the same manner from two images having discontinuous focal ranges of [1, 0, 0, 0, 1, 0, 0, 0, 1, 0, 0, 0, 0, 0, 0, 0, 0, 0, 0, 0] and [0, 0, 0, 0, 0, 0, 0, 0, 0, 0, 0, 0, 1, 0, 0, 0, 1, 0, 0, 0, 1]. FIG. 10A shows that the result of the measurement is significantly different from the result of FIG. 9B particularly on the right side having less texture, but FIG. 10B shows an improved measurement result compared to FIG. 10A.

Methods for obtaining a discontinuous focal range include a method of changing the focus in phases during exposure as shown in FIG. 8, or a method of using an optical element having a discontinuous focal range such as a multifocal lens. The latter can be realized using, for example, a Fresnel lens having a different curvature according to each orbicular zone. The multifocal lens is included in the imaging unit 11 and is provided in the optical path from the subject to the imaging unit 11.

Note that in the above description, the images used for DFD are captured one by one, but the capturing time can be halved if two pictures can be captured at the same time. The following describes the case as variations.

<Variation 1>

Figure 11A:
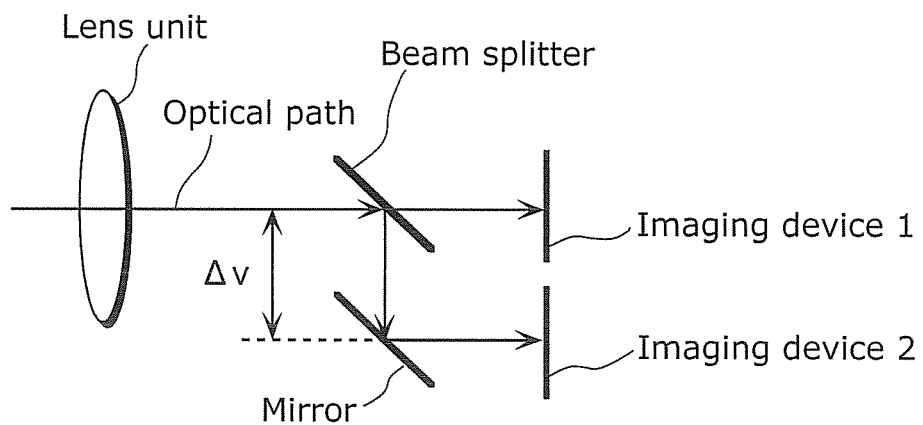
FIG. 11A is a diagram schematically showing an example of an optical path in a first variation.

In the first variation, the imaging unit 11 includes, as shown in FIG. 11A, a lens unit, two imaging devices (imaging devices 1 and 2), a beam splitter for splitting the light, and a mirror for bending the optical path. The two imaging devices are arranged to have different optical path lengths, and the light is collected to both of the imaging devices through the beam splitter. In the configuration shown in FIG. 11A, the imaging device 2 has a longer optical path by Δv.

Figure 11B:
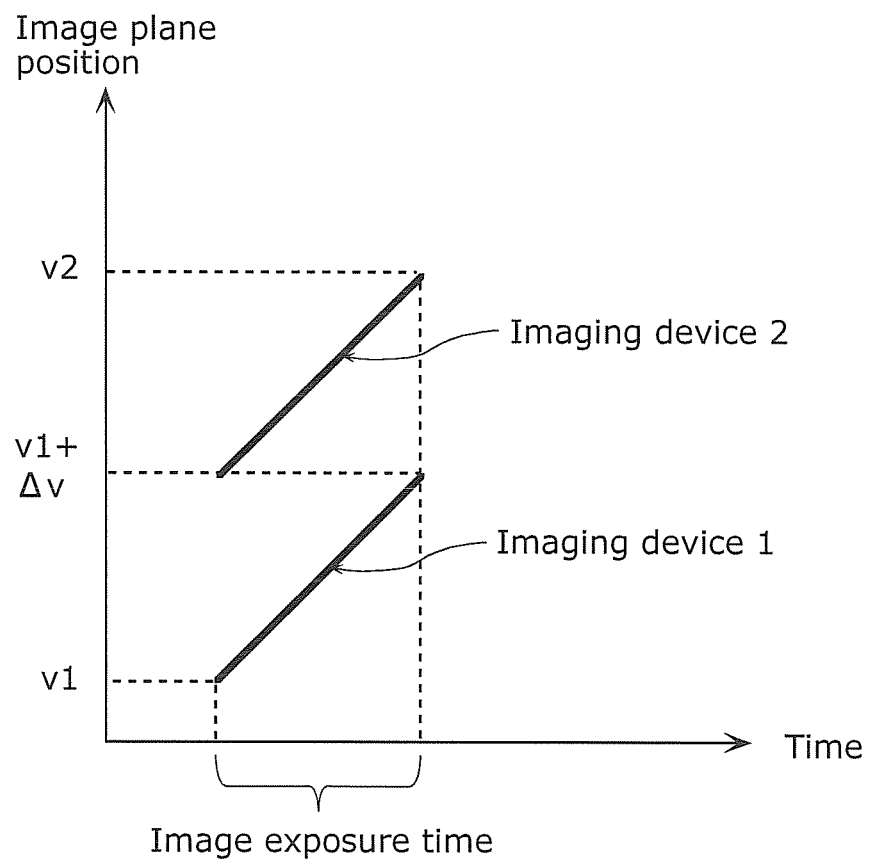
FIG. 11B is a graph showing a state of changing the focal position at a constant speed in the first variation.

In such an optical system, when capturing images using two imaging devices at the same time by changing the focal position at constant speed during exposure, it is possible to obtain, as shown in FIG. 11B, images having focal positions constantly displaced from each other by Δv in the imaging devices 1 and 2. The focal position may be moved by moving the two imaging devices at the same constant speed or by moving the position of the lens included in the lens unit. In doing this, by setting Δv at a midpoint between v1 and v2, it is possible to capture the two images that uniformly cover the focal positions across the entire area from the image plane positions v1 to v2.

Figure 12:
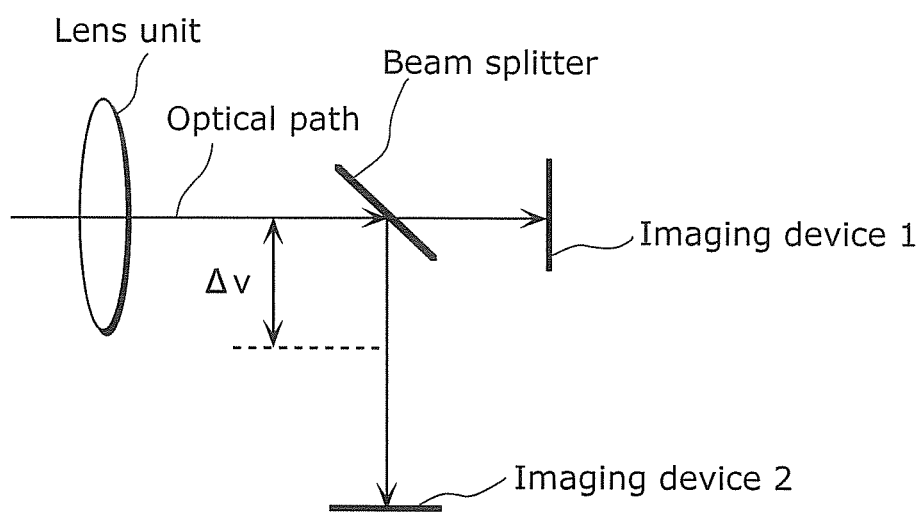
FIG. 12 is a diagram schematically showing another example of the optical path in the first variation.

Note that as a unit to bend the optical path, a prism may be used instead of the mirror. Alternatively, as shown in FIG. 12, a configuration without a mirror or prism may be adopted. Also in this case, the focal position may be moved by moving the two imaging devices at the same constant speed or by moving the position of the lens included in the lens unit.

<Variation 2>

Figure 13A:
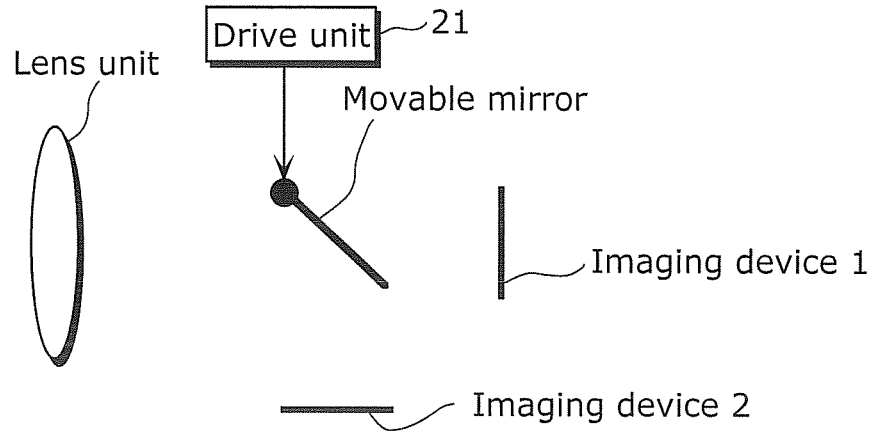
FIG. 13A is a diagram schematically showing an example of an optical path in a second variation.

In the second variation, the imaging unit 11 includes a lens unit and two imaging devices as shown in FIG. 13A (imaging devices 1 and 2), and further includes an optical axis change unit for changing an optical axis direction in the middle of the optical path and a drive unit 21 for directing the optical axis toward one of the two imaging devices. The two imaging devices are provided to have an equal optical length. The optical axis change unit is formed with a movable mirror such as a galvanometer mirror and a MEMS mirror, and the optical axis change unit has a function to guide each of the beams toward a corresponding of the two imaging devices as shown in FIGS. 13B and 13C.

In such an optical system, the focal position is changed at a constant speed during exposure while at the same time directing each of the beams to a corresponding one of the imaging devices 1 and 2 by the optical axis change unit. Since a beam, at a moment, reaches only one of the imaging devices 1 and 2, the imaging devices 1 and 2 are alternately exposed as shown in FIG. 14, so that each of the images has a discontinuous focal range. Note that also in this case, the focal position may be moved by moving the two imaging devices at the same constant speed or by moving the position of the lens included in the lens unit.

Figure 13B:
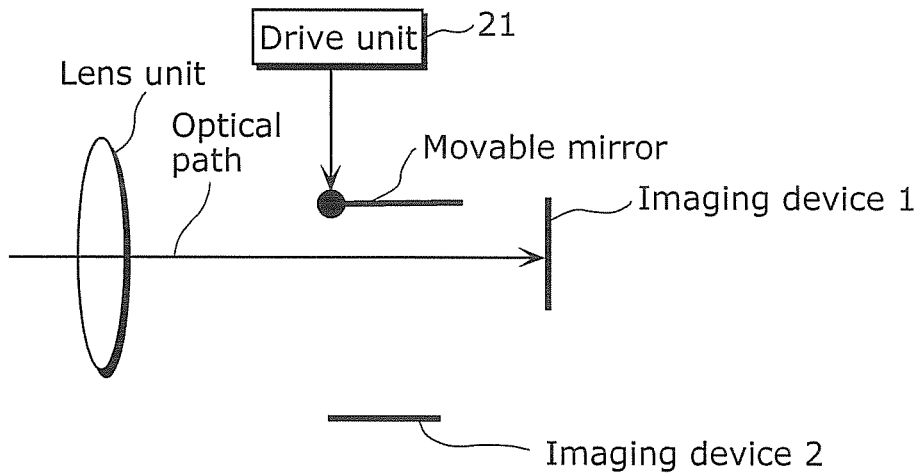
FIG. 13B is a diagram schematically showing a state in which a mirror is directing light toward an imaging device 1.
Figure 13C:
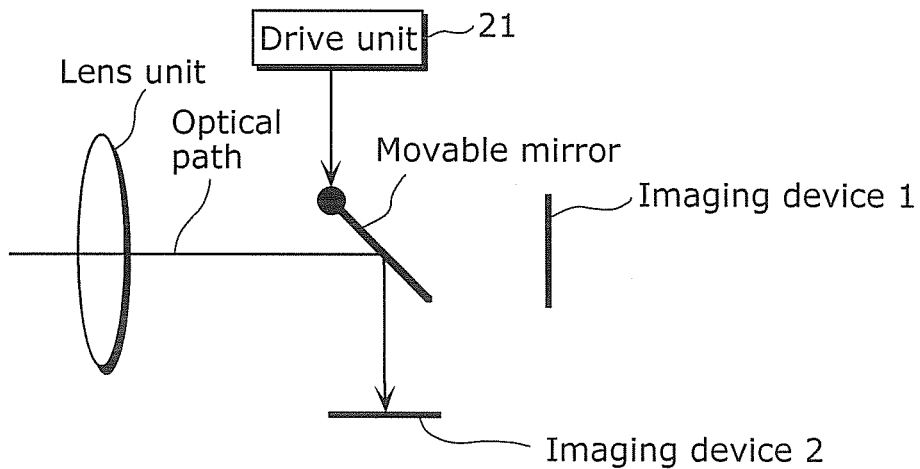
FIG. 13C is a diagram schematically showing a state in which a mirror is directing light toward an imaging device 2.

Note that the optical path in the second variation is not only limited to the mode shown in FIGS. 13A to 13C, but may be an arbitrary optical path as long as the plurality of imaging devices have the same optical length. Nor is the pattern of exposure limited to the mode shown in FIG. 14.

The present invention is applicable to an imaging apparatus including a lens system, and is particularly applicable to a monocular imaging apparatus.

REFERENCE SIGNS LIST

10 Image processing apparatus
11 Imaging unit
12 Focal range control unit
13 Reference image generation unit
14 Distance measurement unit

The invention claimed is:

1. An image processing apparatus, comprising:
a focus lens;
an image sensor that, through the focus lens, captures a first image for a first focal range during a first exposure time period and a second image for a second focal range during a second exposure time period, wherein the first focal range and the second focal range are different;
a controller configured to move the image sensor or the focus lens; and
a distance measurer configured to measure a distance to a subject based on the first image and the second image,
wherein a focal position moves for the first focal range by moving the image sensor or by moving the position of the focus lens during the first exposure time period, and the focal position moves for the second focal range by moving the image sensor or by moving the position of the focus lens during the second exposure time period.

2. The image processing apparatus according to claim 1, wherein the distance measurer is configured to measure the distance to a subject based on a blur of the first image and a blur of the second image.

3. The image processing apparatus according to claim 1, wherein the distance measurer is configured to measure the distance to a subject based on the first image and the second image using a Depth-from-Defocus technique.

4. The image processing apparatus according to claim 1, wherein the focal position moves for the first focal range during the first exposure time period at a speed that is the same as a speed at which the focal position moves for the second focal range during the second exposure time period.

5. The image processing apparatus according to claim 1, wherein the focal position moves for the first focal range during the first exposure time period at a different speed from a speed at which the focal position moves for the second focal range during the second exposure time period.

6. The image processing apparatus according to claim 1, wherein the controller is configured to change a depth of field of the captured first image and a depth of field of the captured second image.

7. The image processing apparatus according to claim 1, wherein at least one of the first focal range and the second focal range is continuous.

8. The image processing apparatus according to claim 1, wherein at least one of the first focal range and the second focal range is discontinuous.

9. An image processing method, comprising:
capturing, using an image sensor and through a focus lens, a first image for a first focal range during a first exposure time period and a second image for a second focal range during a second exposure time period, wherein the first focal range and the second focal range are different;
moving, using a controller, the image sensor or the focus lens; and
measuring, using a distance measurer, a distance to a subject based on the first image and the second image,
wherein a focal position moves for the first focal range by moving the image sensor or by moving the position of the focus lens during the first exposure time period, and the focal position moves for the second focal range by moving the image sensor or by moving the position of the focus lens during the second exposure time period.

10. The image processing method according to claim 9, wherein the measuring of the distance to a subject by the distance measurer is based on a blur of the first image and a blur of the second image.

11. The image processing method according to claim 9, wherein the measuring of the distance to a subject by the distance measurer is based on the first image and the second image using a Depth-from-Defocus technique.

12. The image processing method to claim 9, wherein the focal position moves for the first focal range during the first exposure time period at a speed that is the same as a speed at which the focal position moves for the second focal range during the second exposure time period.

13. The image processing method according to claim 9, wherein the focal position moves for the first focal range during the first exposure time period at a different speed from a speed at which the focal position moves for the second focal range during the second exposure time period.

14. The image processing method according to claim 9, further comprising changing, using the controller, a depth of field of the captured first image and a depth of field of the captured second image.

15. The image processing method according to claim 9, wherein at least one of the first focal range and the second focal range is continuous.

16. The image processing method according to claim 9, wherein at least one of the first focal range and the second focal range is discontinuous.

17. The image processing apparatus according to claim 1, further comprising a reference image generation unit configured to generate a reference image from an average image of n images captured by the image sensor.

18. The image processing method according to claim 9, further comprising generating, using a reference generation unit, a reference image from an average image of n images captured by the image sensor.

19. A non-transitory computer-readable recording medium storing a program which causes a computer to perform all the steps according to the image processing method of claim 9.

\* \* \* \* \*